US011159689B2

(12) United States Patent
Baba et al.

(10) Patent No.: US 11,159,689 B2
(45) Date of Patent: Oct. 26, 2021

(54) IMAGE PROCESSING APPARATUS FOR GENERATING A PREVIEW IMAGE AND NON-TRANSITORY COMPUTER READABLE MEDIUM FOR IMAGE PROCESSING

(71) Applicant: FUJIFILM Business Innovation Corp.

(72) Inventors: Atsuya Baba, Yokohama (JP); Naoki Homma, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 234 days.

(21) Appl. No.: 16/129,858

(22) Filed: Sep. 13, 2018

(65) Prior Publication Data
US 2019/0098154 A1      Mar. 28, 2019

(30) Foreign Application Priority Data

Sep. 27, 2017  (JP) .............................. JP2017-186080
Mar. 19, 2018  (JP) .............................. JP2018-050794

(51) Int. Cl.
*H04N 1/00*        (2006.01)
*H04N 1/333*      (2006.01)

(52) U.S. Cl.
CPC ....... *H04N 1/00482* (2013.01); *H04N 1/0044* (2013.01); *H04N 1/00824* (2013.01); *H04N 1/33376* (2013.01)

(58) Field of Classification Search
CPC .................................................. H04N 1/00482
USPC ......................................................... 358/1.15
See application file for complete search history.

(56) References Cited

U.S. PATENT DOCUMENTS

| | | | |
|---|---|---|---|
| 6,271,933 B1 * | 8/2001 | Asai ................... | H04N 1/00795 358/1.2 |
| 2004/0095594 A1 * | 5/2004 | Moro ...................... | H04N 1/46 358/1.13 |
| 2008/0055629 A1 * | 3/2008 | Kovnat ................... | G06F 16/50 358/1.15 |
| 2016/0080586 A1 * | 3/2016 | Koue ................. | H04N 1/00209 358/448 |

FOREIGN PATENT DOCUMENTS

JP        2006-238106        9/2006

* cited by examiner

*Primary Examiner* — Jacky X Zheng
(74) *Attorney, Agent, or Firm* — Fildes & Outland, P.C.

(57) ABSTRACT

There is provided an image processing apparatus. A changing unit changes settings relative to image data generated by a reading unit for reading a document, in a case where it is not possible to store the image data in a predetermined memory. An image processing unit performs image processing on the image data generated according to the changed settings. A display displays a preview image of the image data subjected to the image processing in the case where it is possible to store the processed image data in the memory.

16 Claims, 9 Drawing Sheets

FIG. 7

| SCANNING IS POSSIBLE. | | | | USER UNAUTHENTICATED |
|---|---|---|---|---|
| SAVE IN SCANNER BOX | IMAGE QUALITY ADJUSTMENT | READING MODE | OUTPUT FORMAT | |
| COLOR MODE | READ RESOLUTION | DOCUMENT IMAGE QUALITY | OUTPUT FILE FORMAT | |
| FULL COLOR | 150dpi | CHARACTER/ LINE-DRAWING | SINGLE-PAGE TIFF | |
| GRAYSCALE (256 GRAY LEVELS) | 200dpi | CHARACTER/ PHOTOGRAPH | MULTI-PAGE TIFF | |
| BLACK-AND-WHITE (TWO LEVELS) | 300dpi | PRINTED PHOTOGRAPH | SINGLE-PAGE PDF | |
| PSEUDO BLACK-AND-WHITE SCALE (TWO LEVELS) | 400dpi | PHOTO OF PRINTED SHEET | MULTI-PAGE PDF | |
| BLACK-AND-RED (TWO LEVELS) | 600dpi | BLUE SLIDE | SINGLE-PAGE DocuWorks | |
| PSEUDO BLACK-AND-RED SCALE (TWO LEVELS) | PREVIEW | OTHER OPTIONS | OTHER OPTIONS | |
| CONFIDENTIAL BOX | [DESTINATION TO SAVE] CONFIDENTIAL BOX 003 (HAVING NO NAME) | | | |

IMAGE PROCESSING APPARATUS FOR GENERATING A PREVIEW IMAGE AND NON-TRANSITORY COMPUTER READABLE MEDIUM FOR IMAGE PROCESSING

CROSS-REFERENCE TO RELATED APPLICATIONS

This application is based on and claims priority under 35 USC 119 from Japanese Patent Application No. 2018-50794 filed on Mar. 19, 2018 and Japanese Patent Application No. 2017-186080 filed on Sep. 27, 2017.

BACKGROUND

Technical Field

The present disclosure is related to image processing apparatus and non-transitory computer readable medium.

SUMMARY

According to an aspect of the present invention, there is provided an image processing apparatus including: a changing unit that changes settings relative to image data generated by a reading unit for reading a document, in a case where it is not possible to store the image data in a predetermined memory; an image processing unit that performs image processing on the image data generated according to the changed settings; and a display that displays a preview image of the image data subjected to the image processing in the case where it is possible to store the processed image data in the memory.

BRIEF DESCRIPTION OF DRAWINGS

Exemplary embodiments of the present invention will be described in detail based on the following figures, wherein:

FIG. 7 is a view illustrating a setting screen;

DETAILED DESCRIPTION

[1] Configuration

Figure 1:
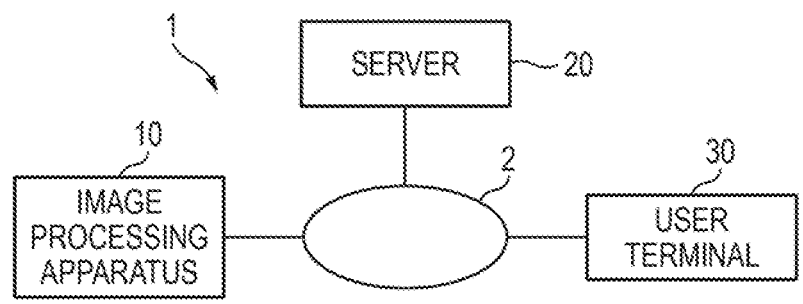
FIG. 1 is a view illustrating the configuration of an image processing system.

FIG. 1 is a block diagram illustrating the configuration of an image processing system 1 according to an exemplary embodiment. The image processing system 1 includes an image processing apparatus 10, a server 20, and a user terminal 30. The image processing apparatus 10 performs image processing such as an image forming process of forming images on media such as paper and an image reading process of reading images formed on media such as documents. The server 20 provides various services such as a storage service. The user terminal 30 is, for example, a smart phone, a tablet terminal, or a notebook type PC (Personal Computer). The image processing apparatus 10 is connected to the server 20 and the user terminal 30 by a communication line 2. The communication line 2 includes at least one of the Internet, a mobile communication network, a phone line, a local area network (LAN), and so on.

In the present exemplary embodiment, the user terminal 30 also functions as a display device for displaying various screens of the image processing apparatus 10 such as a menu screen and preview screens. In the case where the user terminal 30 is used as a display device of the image processing apparatus 10, the image processing apparatus 10 transmits data representing the menu screen, preview screens, and so on to the user terminal 30, and the user terminal 30 displays a variety of information on the menu screen, the preview screens, and so on according to the data received from the image processing apparatus 10, on a display panel of the user terminal.

Figure 2:
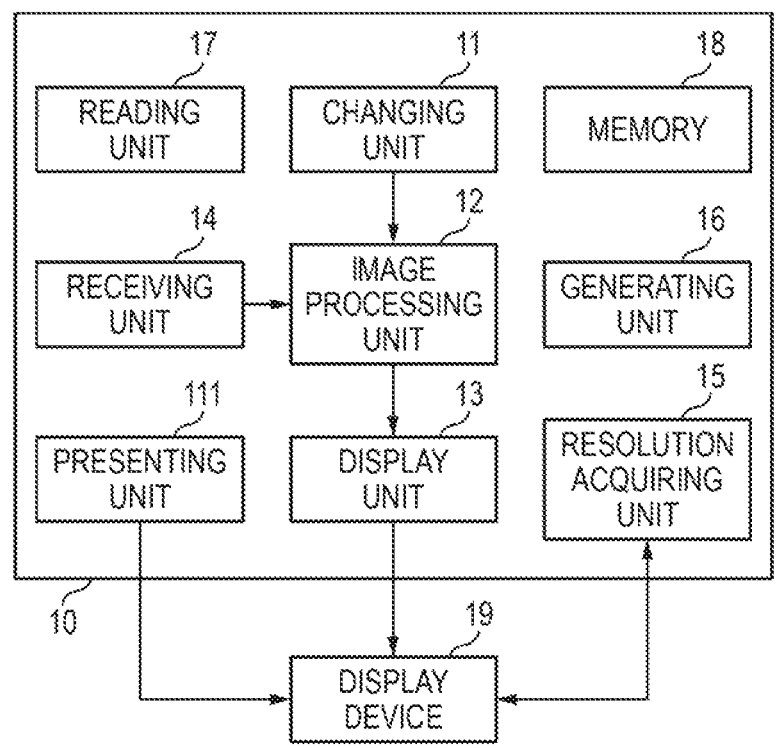
FIG. 2 is a view illustrating the functional configuration of the image processing system.

FIG. 2 is a block diagram illustrating the functional configuration of the image processing system 1. In FIG. 2, a changing unit 11 changes settings relative to image data generated by a reading unit 17 configured to read documents, in the case where it is impossible to store the corresponding image data in a predetermined memory. An image processing unit 12 performs image processing on the image data according to the settings changed by the changing unit 11. A display unit 13 displays a preview image of the image data subjected to the image processing of the image processing unit 12 on a display device 19 in the case where the corresponding image data can be stored in a memory 18. The term "preview image" means an image which represents image data stored in the memory and is displayed on the display device such that a user can check the content of the corresponding image data. A receiving unit 14 receives a setting change operation if a user performs the corresponding operation in the state where the preview image is displayed by the display unit 13.

A resolution acquiring unit 15 acquires the resolution of the display device 19. A generating unit 16 generates preview image data having the acquired resolution or resolution lower than the acquired resolution, as preview image data of the image data. A presenting unit 111 presents a parameter as a change subject to the user in the case where it is impossible to store the image data generated by the generating unit 16 in the memory 18.

Figure 3:
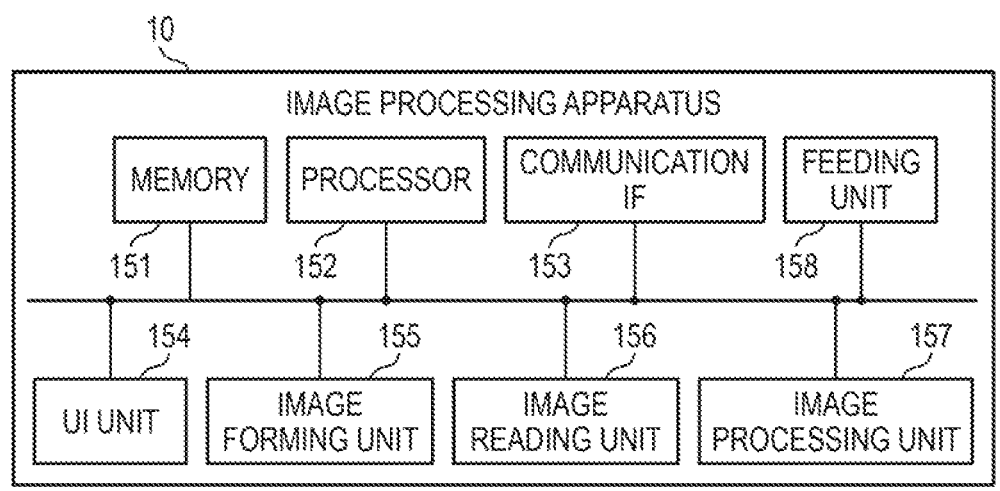
FIG. 3 is a view illustrating the hardware configuration of an image processing apparatus.

FIG. 3 is a view illustrating the hardware configuration of the image processing apparatus 10. In FIG. 3, a memory 151 is for storing a variety of data. A processor 152 performs data processing according to programs stored in the memory 151. A communication IF 153 is an interface for performing data communication with external devices via a network. An UI unit 154 has, for example, a touch screen and keys. An image forming unit 155 forms images on media such as paper in an electrophotographic way. The UI unit 154 may be installed in the image processing apparatus 10, or may be attached to the outside of the image processing apparatus and is externally connected to the image processing apparatus. An image reading unit 156 optically reads images of documents (media). An image processing unit 157 has, for example, a digital signal processor (DSP) and a graphics processing unit (GPU), and performs a variety of image processing. A feeding unit 158 feeds media such as paper to the image forming unit 155.

In this example, at least one of the processor 152 and the image processing unit 157 executes the programs stored in the memory 151, whereby the functions shown in FIG. 2 are implemented. At least one of the processor 152 and the image processing unit 157 which is executing the programs is examples of the changing unit 11, the image processing unit 12, the display unit 13, the receiving unit 14, the resolution acquiring unit 15, the generating unit 16, and the presenting unit ill. The image reading unit 156 is an example of the reading unit 17. The memory 18 is an example of the memory 151. The UI unit 154 is an example of the display device 19.

Figure 4:
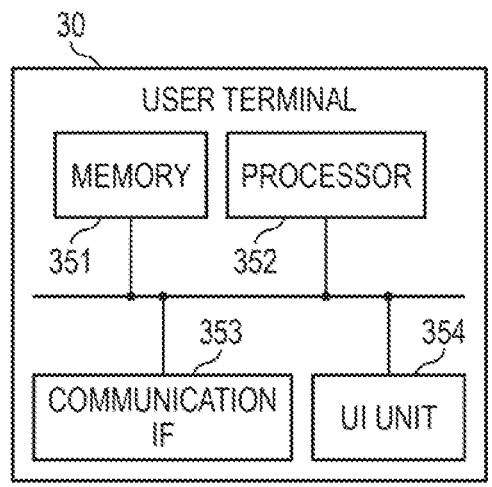
FIG. 4 is a view illustrating the hardware configuration of a user terminal.

FIG. 4 is a view illustrating the hardware configuration of the user terminal 30. In FIG. 4, a memory 351 is for storing a variety of data. A processor 352 performs data processing according to programs stored in the memory 351. A communication IF 353 is an interface for performing data communication with external devices via the communication line 2. An UI unit 354 has, for example, a touch screen and keys.

[2] Operation

[2-1] Operation Example 1

Figure 5:
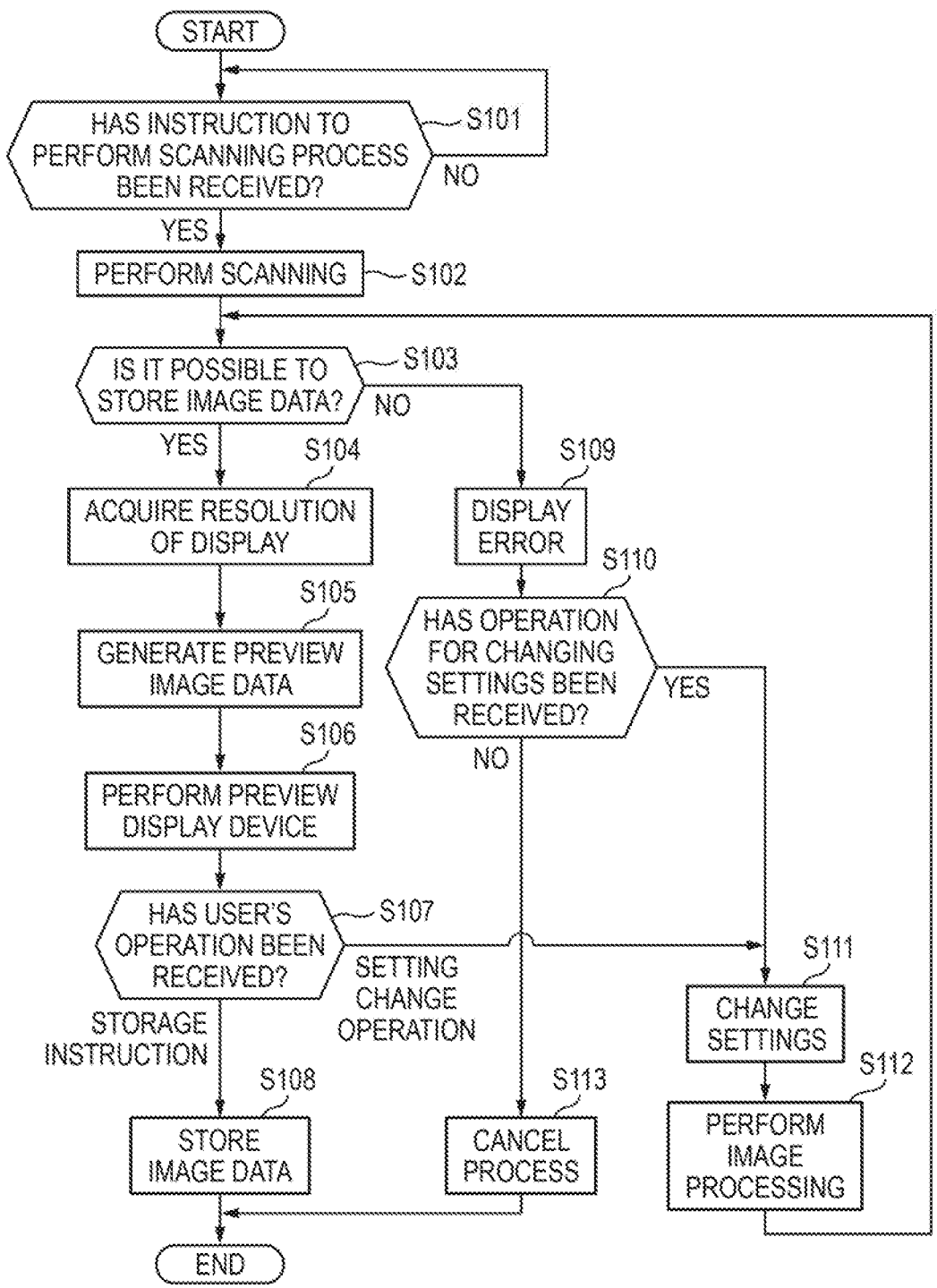
FIG. 5 is a flow chart illustrating the flow of a process of the image processing apparatus.

FIG. 5 is a flow chart illustrating the flow of a process of the image processing apparatus 10. In STEP S101, the processor 152 stands by until the user sets a document (for example, a large-sized document) on the image processing apparatus 10 and gives an instruction to perform a scanning process. In the present exemplary embodiment, examples of a large-sized document include documents which meet JIS (such as A0 size documents and A1 size documents), and documents which do not meet JIS (such as a roll of paper).

In the present exemplary embodiment, the user can use the UI unit 154 of the image processing apparatus 10 or the UI unit 354 of the user terminal 30 to give an instruction to perform a scanning process. In the case where the UI unit 154 of the image processing apparatus 10 is used, the processor 152 of the image processing apparatus 10 displays the menu screen of the image processing apparatus 10 on the UI unit 154, and the user uses the screen displayed on the UI unit 154 to give instructions to perform various processes. Meanwhile, in the case where the UI unit 354 of the user terminal 30 is used, the processor 152 of the image processing apparatus 10 transmits data representing the menu screen to the user terminal 30, and the processor 352 of the user terminal 30 displays the menu screen on the UI unit 354 according to the data received from the image processing apparatus 10. In this case, the user uses the menu screen displayed on the UI unit 354 to give instructions to perform various processes. In the case where the user performs an operation for giving an instruction to perform a scanning process, the user terminal 30 transmits data representing the content of the user's operation to the image processing apparatus 10, and the processor 152 of the image processing apparatus 10 receives the corresponding data from the user terminal 30, thereby detecting that the instruction to perform the scanning process has been given. If detecting that the instruction to perform the scanning process has been given ("YES" in STEP S101), the processor 152 proceeds to the process of STEP S102.

In STEP S102, the processor 152 controls the image reading unit 156 such that the image reading unit performs the scanning process. In other words, the processor 152 controls the image reading unit 156 such that the image reading unit reads an image of the document set on the image processing apparatus 10. Data of the read image is generated according to preset setting values. The setting values represent, for example, the resolution and file format of the image data. For example, in the case where the resolution has been set to 600 dpi, and the file format has been set to JPEG (Joint Photographic Experts Group), a file having the JPEG format and having the resolution of 600 dpi is generated.

In STEP S103, the processor 152 determines whether it is possible to store the image data representing the document read by the image reading unit 156 in a predetermined memory area (hereinafter, referred to as a memory area M1). This determination is performed, for example, on the basis of the data amount and file format of the image data. In the present exemplary embodiment, in the case where at least one of the data amount and file format of the generated image data satisfies a predetermined condition, the processor 152 determines that it is possible to perform the storing process. For example, in the case where a large-sized document has been read, the data amount of image data may be too large to be stored in the memory area M1. In this case, the processor determines that it is impossible to store the image data in the memory area M1. Also, as another example, in some cases such as the case where a large-sized document has been read, the size of image data may exceed the upper limit of the standard of the set file format. For example, in the case where JPEG has been designated as the file format and the width of the read document exceeds 2722 mm which is the upper limit of JPEG, or in the case where a large magnification or a large size has been designated, and as a result, a large amount of image data is generated, it is impossible to store the image data in JPEG. In this case, the processor determines that it is impossible to store the data on the read image in the memory area M1.

In the case where it is determined in STEP S103 that it is possible to store the image data in the memory area M1 ("YES" in STEP S103), the processor 152 proceeds to the process of STEP S104. Meanwhile, in the case where it is determined that it is impossible to store the image data ("NO" in STEP S103), the processor 152 proceeds to the process of STEP S109.

In STEP S104, the processor 152 acquires the resolution of a display device (the UI unit 154, the UI unit 354, or the like) which is a preview image display destination. In the present exemplary embodiment, in the case where the UI unit 154 has been used to give the instruction to perform the scanning process, the UI unit 154 is set as the preview image display destination. Meanwhile, in the case where the UI unit 354 of the user terminal 30 has been used to give the instruction to perform the scanning process, the UI unit 354 is set as the preview image display destination. In the case where the UI unit 154 is the preview image display destination, the processor 152 reads out information representing resolution corresponding to the UI unit 154 from a predetermined memory. Meanwhile, in the case where the UI unit 354 is the preview image display destination, the processor 152 performs a process of inquiring the user terminal 30 about the resolution of the UI unit 354. In this case, the user terminal 30 transmits information representing the resolution corresponding to the UI unit 354, in response to the inquiry received from the image processing apparatus 10, and the image processing apparatus 10 receives that information from the user terminal 30, thereby acquiring the resolution.

In STEP S105, the processor 152 generates preview image data having resolution equal to or lower than the resolution acquired in STEP S104, as preview image data of the generated image data. In the present exemplary embodiment, in the case where the resolution of the generated image data is higher than the resolution acquired in the STEP S104, the processor 152 lowers the resolution of the generated image data to the acquired resolution, thereby generating preview image data. For example, in the case where the resolution of the image data generated by scanning and storable in the predetermined storage is 600 dpi, and the resolution of a UI panel is 100 dpi, the processor lowers the resolution of the image data to 100 dpi, thereby generating preview image data. However, in the case where the resolution of the generated image data is equal to or lower than the resolution of the display device, the process of generating preview image data is not performed. In this case, the image data of the read document is used as preview image data, without changing the image data.

In STEP S106, the processor 152 supplies the preview image data generated in STEP S105, to the display device, and performs control such that the display device displays a preview image. In the case where the UI unit 154 is the preview image display destination, the processor 152 outputs the preview image data to the UI unit 154. Meanwhile, in the case where the UI unit 354 of the user terminal 30 is the preview image display destination, the processor 152 transmits the preview image data to the user terminal 30, and instructs the user terminal 30 to display the preview image.

Figure 6:
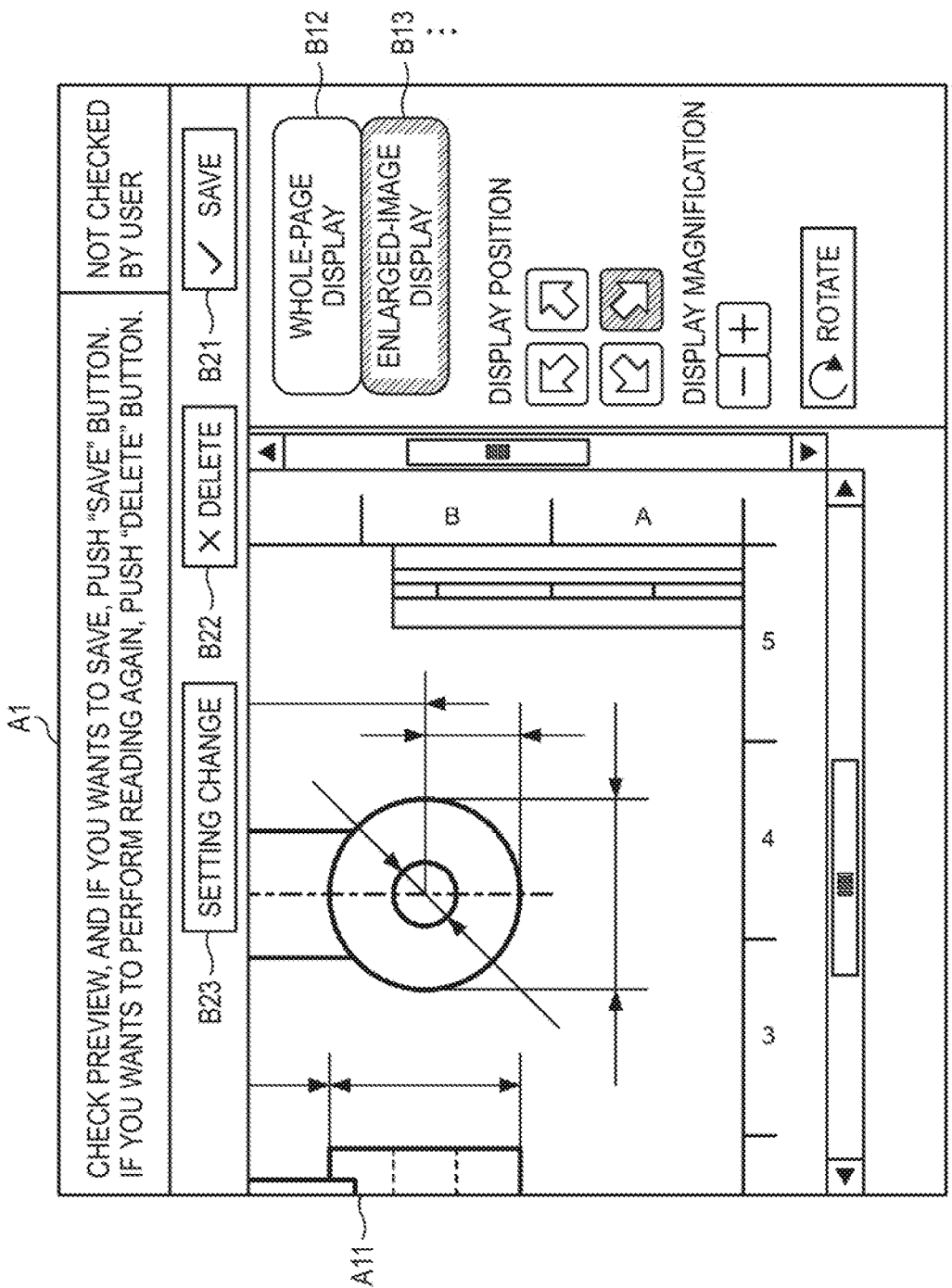
FIG. 6 is a view illustrating a preview screen.

FIG. 6 is a view illustrating a preview screen which is displayed. A preview screen A1 illustrated in FIG. 6 includes a preview image area A11 where the preview image is displayed, various buttons for changing the display mode of the preview image like buttons B12 and B13, a "SAVE" button B21, a "DELETE" button B22, a "SETTING CHANGE" button B23, and so on. In state where the preview image is displayed, the user gives an instruction to store the image data or change the settings by operating the UI unit 154 (or the UI unit 354). In order to give an instruction to store the image data, the user pushes the "SAVE" button B21. Meanwhile, in order to change the settings, the user pushes the "SETTING CHANGE" button B23. As described above, in the state where the preview image is displayed, the processor 152 receives a setting change operation or a storage instruction from the user.

A further description of FIG. 5 will be made. In the case where the user has given a storage instruction ("STORAGE INSTRUCTION" in STEP S107), the processor 152 proceeds to the process of STEP S108. Meanwhile, in the case where the user has given a setting change operation ("SETTING CHANGE OPERATION" in STEP S107), the processor 152 proceeds to the process of STEP S111.

In STEP S108, the processor 152 performs a process of storing the image data of the read document in the predetermined storage according to the instruction of the user.

In STEP S109, the processor 152 controls the display panel such that the display panel displays an error message representing that it is impossible to perform the process of storing the image data. Also, at this time, the processor 152 performs a process of presenting a setting parameter as a change subject by controlling the display panel such that the display panel displays a setting change screen useable to make it possible to perform the process of storing the image data. For example, in the case where the data amount of the image data is too large to be stored in the memory, the processor 152 may control the display panel such that the display panel displays a setting change screen for changing the resolution of the image data or a setting change screen for changing from a color mode to a monochrome mode. Also, for example, in the case where a large-sized document has been read, if the size of the document is larger than the upper limit for the defined values of file formats, the processor 152 may control the display panel such that the display panel displays a screen for changing image data to another file format.

The user uses the UI unit 154 (or the UI unit 354) to perform an operation for changing the settings. In the case where it is determined in STEP S110 that an operation for changing the settings has been performed by the user ("YES" in STEP S110), the processor 152 proceeds to the process of STEP S111. Meanwhile, in the case where it is determined that an operation for changing the settings has not been performed ("NO" in STEP S110), the processor 152 proceeds to the process of STEP S113.

In STEP S111, the processor 152 changes the settings relative to the image data generated by the image reading unit 156, according to information output from the UI unit 154 (or the UT unit 354) operated by the user. In the present exemplary embodiment, for example, the resolution of the image data is changed to low resolution, or the file format is changed. In STEP S112, the processor 152 performs image processing on the image data which is the object to be stored, according to the changed settings. For example, in the case where change of the settings to lower the resolution has been performed, the processor 152 controls the image processing unit 157 such that the image processing unit performs image processing for changing the resolution of the image data. Also, in the case where change of the settings to change the file format has been performed, the processor 152 controls the image processing unit 157 such that the image processing unit performs processing for changing the file format of the image data. If finishing the image processing of STEP S112, the processor 152 returns to the process of STEP S103, and determines whether it is possible to perform the process of storing the image data subjected to the image processing.

Meanwhile, in the case where it is determined in STEP S110 that an operation for changing the settings has not been performed ("NO" in STEP S110), the processor 152 cancels the instructed process in STEP S113, and finishes the process.

In the present exemplary embodiment, after an operation for changing the settings is performed on a scan resetting screen, with respect to the original image data obtained by scanning, image data is regenerated according to the designated settings, and if it is determined that it is possible to store the regenerated image data, a preview image is displayed. As a result, the user can check the result image according to the changed settings, and storage of the image data confirmed by the preview display is ensured. Therefore, even though an error or the like occurs, it is unnecessary to scan the document again.

Further, if necessary, it is possible for the user to change the settings again on the preview check screen displayed after resetting of scanning. Specifically, as shown in STEPS S107 to S112 of FIG. 5, in the state where the preview image is displayed, whenever an operation of the user for changing the settings is received, image processing is formed on image data subjected to image processing, according to the changed settings.

Also, since a UI screen of an operation unit of an image processing apparatus or the like is for making settings, in general, the screen has low resolution and has a narrow display area. For this reason, in the case of displaying a preview image on a UI panel of an image processing apparatus, even if display of a high-resolution image is tried, it is impossible to display a preview with an image quality higher than the resolution of the UI screen. Also, when display of a high-resolution image is tried, it may take a long time and operability may be bad. In contrast, in the present exemplary embodiment, the preview image to be displayed on the preview screen does not need the resolution of the stored image data, and is converted into an image having the resolution of the UI panel for displaying it, on the basis of the stored image data. In general, UI panels have low resolution. For this reason, the size of the preview image data is reduced, whereby the time to display the preview is reduced. Also, since the preview image is generated according to the UI resolution, even if the resolution is low, preview display is performed without deterioration of the image such as crushing.

[2-2] Operation Example 2

Now, another operation example of the present exemplary embodiment will be described. In the present operation example, the image processing apparatus 10 operates in an operation mode selected from two or more operation modes including an image quality priority mode in which image quality is prioritized and a size priority mode in which size is prioritized. First, the user sets a document (for example, a large-sized document) on the image processing apparatus 10, and performs a setting operation related to a scanning process, on an operation screen displayed on the display device (the UI unit 154 or the UI unit 354), thereby issuing an instruction to perform a scanning process.

FIG. 7 is a view illustrating a setting screen which can be displayed on the display device. In the example of FIG. 7, options "COLOR MODE", "READ RESOLUTION", "DOCUMENT IMAGE QUALITY", AND "OUTPUT FILE FORMAT" can be set. As the option "COLOR MODE", any one of options "FULL COLOR", "GRAYSCALE (256 GRAY LEVELS)", "BLACK-AND-WHITE (TWO LEVELS)", "PSEUDO BLACK-AND-WHITE SCALE (TWO LEVELS)", "BLACK-AND-RED (TWO LEVELS)", and "PSEUDO BLACK-AND-RED SCALE (TWO LEVELS)" can be selected by the user. As the option "READ RESOLUTION", any one of resolution values "150 dpi", "200 dpi", "300 dpi", "400 dpi", and "600 dpi" can be selected by the user. As the option "DOCUMENT IMAGE QUALITY", any one of options "CHARACTER/LINE-DRAWING" and "CHARACTER/PHOTOGRAPH" can be selected by the user. As the option "OUTPUT FILE FORMAT", any one of options "SINGLE-PAGE TIFF", "MULTI-PAGE TIFF", "SINGLE-PAGE PDF", and "MULTI-PAGE PDF" can be selected by the user.

Figure 8:
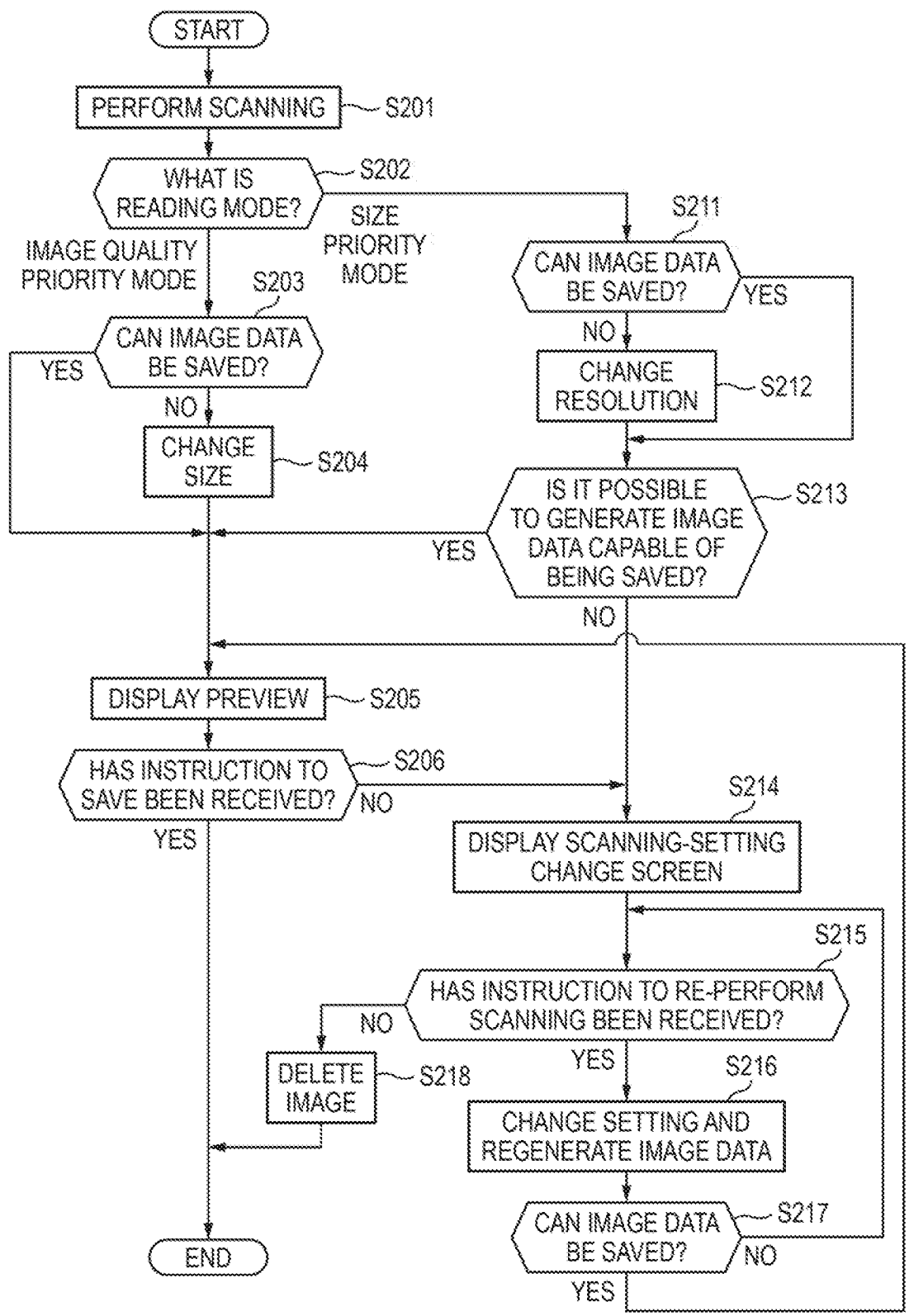
FIG. 8 is a flow chart illustrating the flow of processing of the image processing apparatus.

FIG. 8 is a flow chart illustrating the flow of processing which is performed by the image processing apparatus 10. If the user sets a document (for example, a large-sized document) on the image processing apparatus 10, and issues an instruction to perform a scanning process, in STEP S201, the processor 152 controls the image reading unit 156 such that the image reading unit performs a scanning process. In other words, the processor 152 controls the image reading unit 156 such that the image reading unit reads an image of the document set on the image processing apparatus 10.

Figure 9:
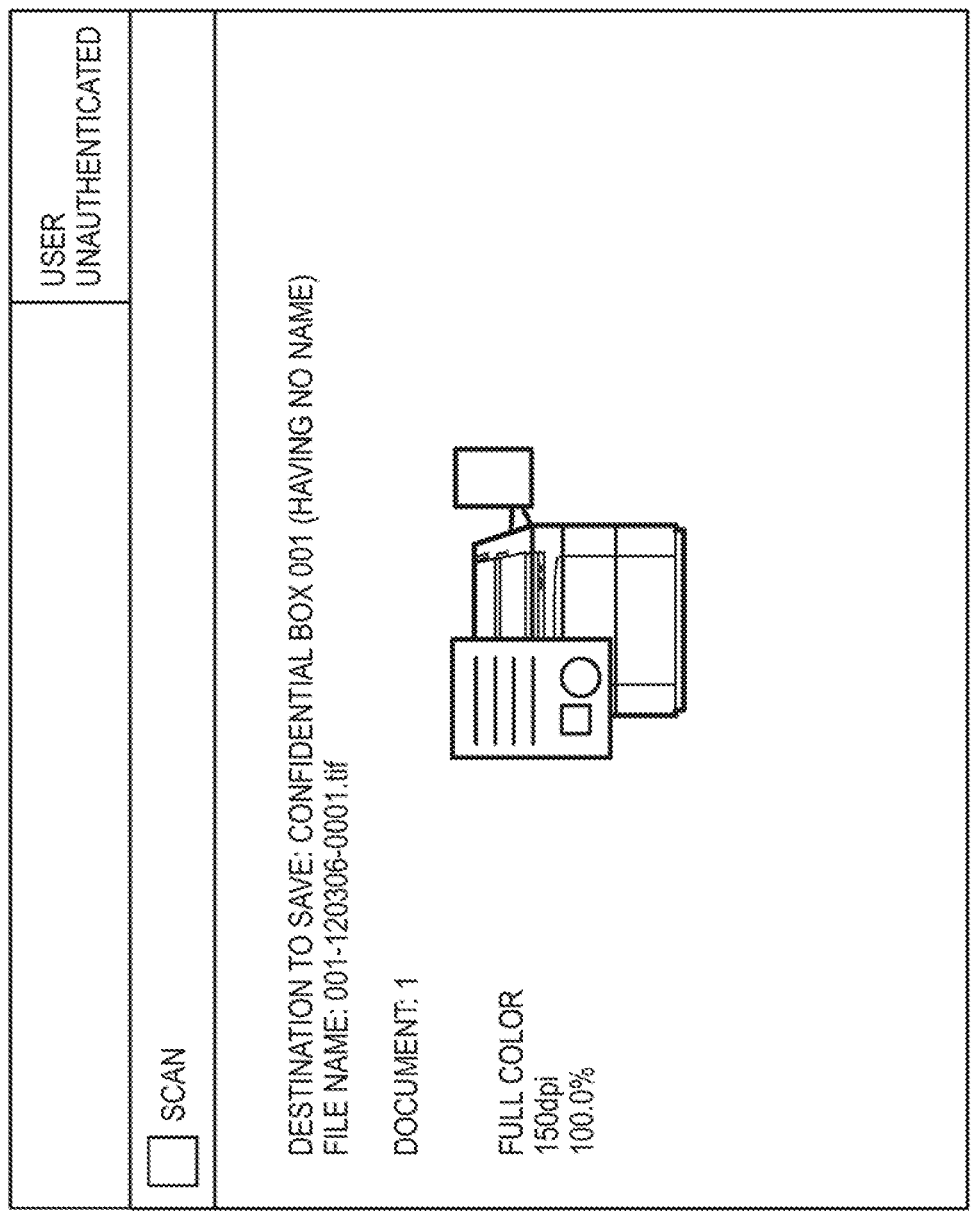
FIG. 9 is a view illustrating a screen which can be displayed during a scanning process.

FIG. 9 is a view illustrating a screen which can be displayed on the display device during a scanning process. In the example of FIG. 9, a variety of information such as the destination to save image data, a file name, and setting values of scanning options are displayed. Image data are generated according to setting values set by the user. For example, in the case where the resolution is set to 600 dpi, and the file format is set to JPEG (Joint Photographic Experts Group), a JPEG file having the resolution of 600 dpi is generated. Meanwhile, in the case where settings for scanning have not been configured by the user, default values are referred to.

A further description of FIG. 8 will be made. In STEP S202, the processor 152 determines whether the operation mode is the image quality priority mode or the size priority mode. The image processing apparatus 10 has the image quality priority mode and the size priority mode as operation modes. The image quality priority mode is a mode in which image quality is prioritized than the image size of image data to be saved. The size priority mode is a mode in which image size is prioritized than the image quality of image data to be saved. An operation mode may be set by a user's operation, or a preset default value may be referred to. In the case where it is determined in STEP S202 that the operation mode is the image quality priority mode, the processor 152 proceeds to the process of STEP S203. Meanwhile, in the case where the operation mode is the size priority mode, the processor 152 proceeds to the process of STEP S211.

In STEP S203, the processor 152 determines whether the generated image data can be saved in a predetermined memory area M1. This determining process is identical to the process of STEP S103 of FIG. 5, and, for example, on the basis of the data amount of the image data and the file format, determination is performed. For example, in the case where a large-sized document has been read, the data amount of image data may be so large that the image data cannot be saved in the memory area M1. In this case, it is determined that the image data cannot be saved in the memory area M1.

In the case where it is determined in STEP S203 that the image data can be saved in the memory area M1 ("YES" in STEP S203), the processor 152 proceeds to the process of STEP S205 without performing the process of STEP S204. Meanwhile, in the case where it is determined that the image data cannot be saved ("NO" in STEP S203), the processor 152 proceeds to the process of STEP S204.

In the STEP S204, the processor 152 performs a process of changing the image size to such a size that the image data can be saved, without changing the resolution of the image data (while keeping high resolution). In other words, in the case where the operation mode is the image quality priority mode, the processor 152 performs a process of reducing the image size of the image data generated by the image reading unit 156, without waiting for a user's instruction to change the size setting. If finishing the process of STEP S204, the processor 152 proceeds to the process of STEP S205.

Meanwhile, in the case where the operation mode is the size priority mode, the processor 152 proceeds to the process of STEP S211. In the STEP S211, the processor 152 determines whether the generated image data can be saved in the predetermined memory area M1. This determining process is identical to the process of STEP S203, and, for example, on the basis of the data amount of the image data and the file format, determination is performed. For example, in the case where a large-sized document has been read, the data amount of image data may be so large that the image data cannot be saved in the memory area M1. In this case, it is determined that the image data cannot be saved in the memory area M1.

In the case where it is determined in STEP S211 that the image data can be saved in the memory area M1 ("YES" in STEP S211), the processor 152 proceeds to the process of STEP S213 without performing the process of STEP S212. Meanwhile, in the case where it is determined that the image data cannot be saved ("NO" in STEP S211), the processor 152 proceeds to the process of STEP S212.

In STEP S212, the processor 152 changes the resolution without changing the size of the image data, and generates image data capable of being saved. In other words, in the case where the operation mode is the size priority mode, the processor 152 performs a process of reducing the resolution of the image data generated by the image reading unit 156, without waiting for a user's instruction to change the resolution setting.

In STEP S213, the processor 152 determines whether it is possible to generate image data capable of being saved. For example, in the case where a document is large, even through the resolution is set to the minimum value, the image size may be so large that the image data cannot be saved in the memory area M1. In this case, it is determined that it is impossible to generate image data capable of being saved. In the case where it is determined that it is possible to generate image data ("YES" in STEP S213), the processor 152 proceeds to the process of STEP S205. Meanwhile, in the case where it is determined that it is impossible to generate image data ("NO" in STEP S213), the processor 152 proceeds to the process of STEP S214.

In STEP S205, the processor 152 performs a process of displaying a preview image. In the present operation example, in the case where the resolution of the generated image data is higher than the resolution of the display device (the UI unit 154 and the UI unit 354), the processor 152 generates preview image data having an acquired resolution lower than the resolution of the generated image data, and outputs the generated preview image data to the display device. Meanwhile, in the case where the resolution of the generated image data is equal to or lower than the resolution of the display device, the process of generating preview image data is not performed. In this case, the image data of the read document is used as preview image data, without any change.

Figure 10:
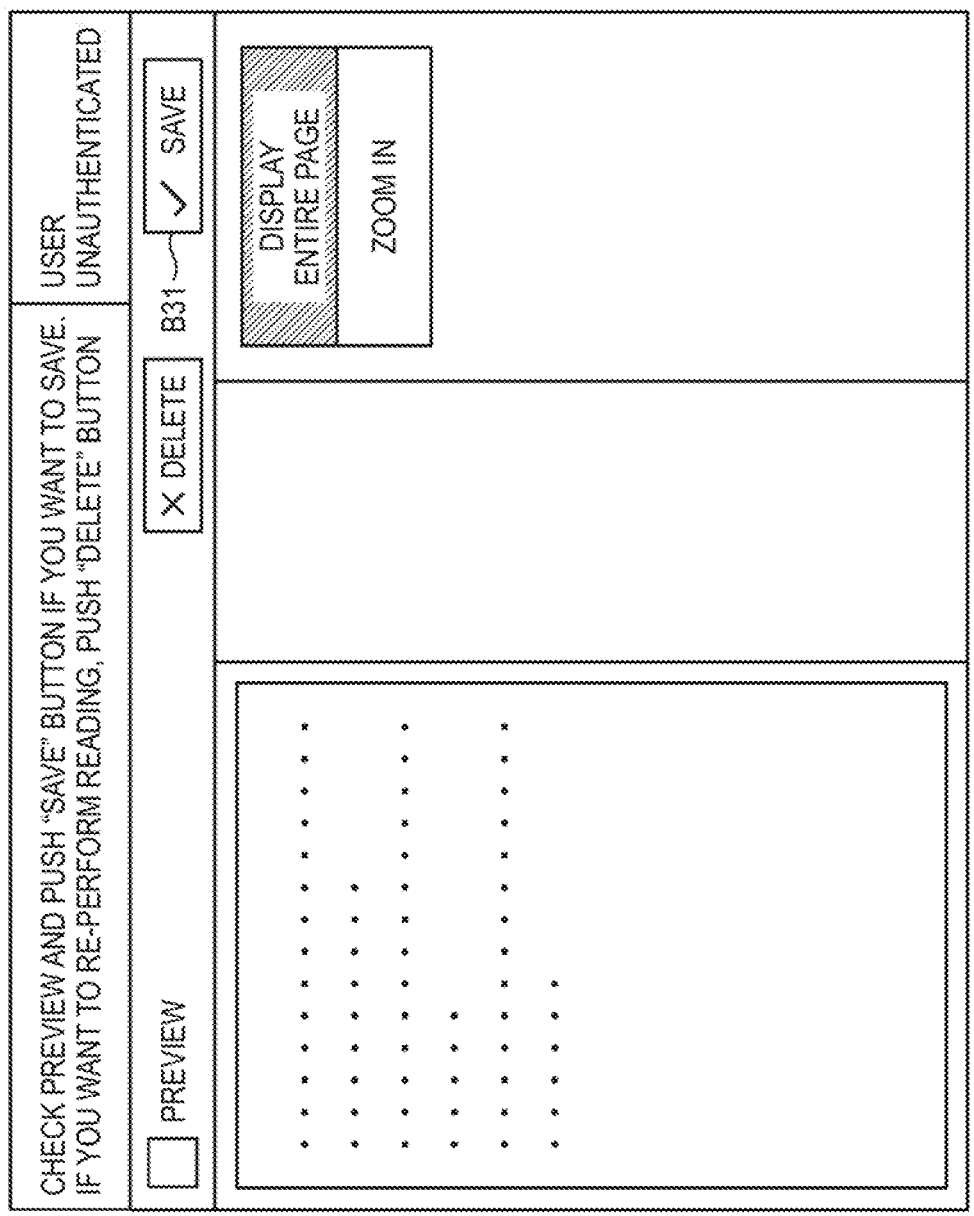
FIG. 10 is a view illustrating a preview screen.

FIG. 10 is a view illustrating a preview screen which can be displayed on the display device. If the preview image data is supplied to the display device, the display device displays a preview screen including the preview image. In a state where the preview image is displayed, the user issues an instruction to save the image data, by operating the UI unit 154 (or the UI unit 354). In order to issue an instruction to save the image data, the user pushes a "SAVE" button B31. As a result, in the state where the preview image is displayed, the processor 152 receives the user's instruction to save.

A still further description of FIG. 8 will be made. In the case where a user's instruction to save has been received ("YES" in STEP S206), the processor 152 performs a process of saving the image data in a predetermined storage. Meanwhile, in the case where a user's instruction to save has not been received ("NO" in STEP S206), the processor 152 proceeds to the process of STEP S214.

In STEP S214, the processor 152 performs a process of displaying a scanning-setting change screen for making it possible to perform the process of saving the image data, thereby presenting a setting parameter (for example, the size setting) which can be changed, to the user. In other words, in the case where the process of saving the image data in the memory area M1 cannot be performed although the process of reducing the resolution (STEP S212) was performed, the processor 152 performs a process of urging the user to change the setting (STEP S214). In this case, an error message representing it is impossible to perform the process of saving the image data may be displayed on the display device.

Figure 11:
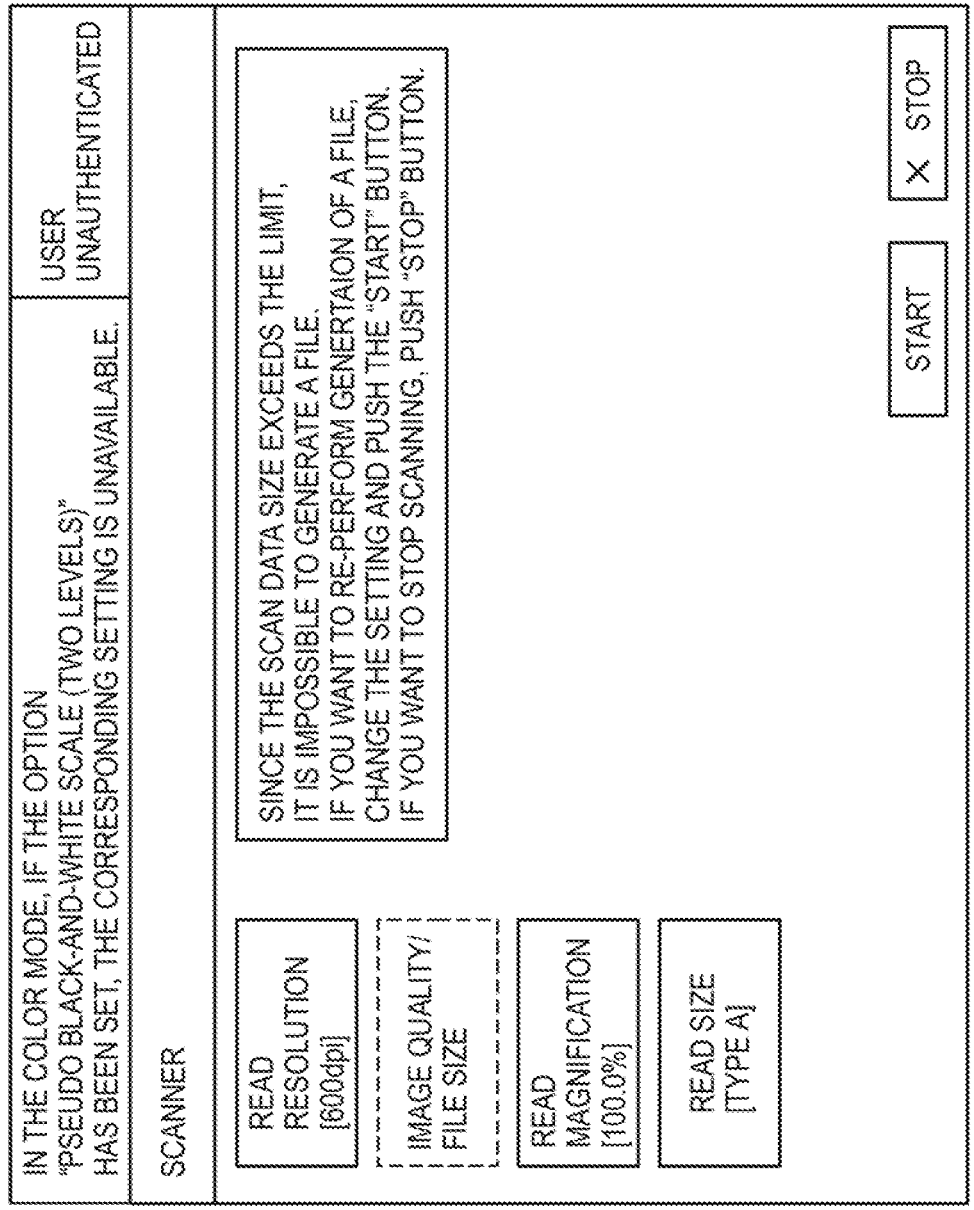
FIG. 11 is a view illustrating a screen which can be displayed.

FIG. 11 is a view illustrating a setting change screen which can be displayed in STEP S214. In the example of FIG. 11, a message representing that it is impossible to generate an image file and the user needs to change the setting is displayed. For example, in the case where a large-sized document has been read, if the size of the document is larger than the upper limit of values defined for a preset file format, the processor 152 may control the display unit such that the display unit displays a screen for changing to another file format. Also, for example, in the case where the data amount of image data is so large that the image data cannot be saved in the memory, the processor 152 may control the display device such that the display device displays a setting change screen for changing the resolution of the image data, a setting change screen for changing the option "COLOR MODE" to a monochrome mode, or a setting change screen for changing the image size. The user performs an operation to change the setting for scanning, on the UI unit 154 (or the UI unit 354).

A still further description of FIG. 8 will be made. In the case where a user's instruction to re-perform scanning has been received ("YES" in STEP S215), the processor 152 proceeds to the process of STEP S216. Meanwhile, in the case where a user's instruction to re-perform scanning has not been received ("NO" in STEP S215), the processor 152 proceeds to the process of STEP S218.

In STEP S216, the processor 152 changes the scanning setting relative to the image data generated by the image reading unit 156, according to the content changed by the user. In the present operation example, for example, the file format is changed. Also, the processor 152 performs image processing according to the changed scanning setting, on the image data which is the object to be saved. For example, in the case where change in the settings, specifically, change of the file format has been performed, the processor 152 controls the image processing unit 157 such that the image processing unit performs a process of changing the file format of the image data. If finishing the image processing of STEP S216, the processor 152 proceeds to the process of STEP S217.

In STEP S217, the processor 152 determines whether the regenerated image data can be saved in the predetermined memory area M1. This determining process is identical to the process of STEP S203. In the case where it is determined in STEP S217 that the image data can be saved in the memory area M1 ("YES" in STEP S217), the processor 152 proceeds to the process of STEP S205. Meanwhile, in the case where it is determined that the image data cannot be saved ("NO" in STEP S217), the processor 152 returns to the process of STEP S215.

In STEP S218, the processor 152 deletes the generated image data, and finishes the processing.

As described above, in the present operation example, the image processing apparatus 10 has the operation modes (the image quality priority mode and the size priority mode). The image processing apparatus 10 specifies settings capable of being saved according to the operation mode, on the basis of the read scan image, and generates an image file according to the specified settings. In the image quality priority mode, if it is determined on the basis of the size of the image read by the image reading unit 156 that the scan image can be saved with high resolution (for example, 600 dpi) without changing the size of the read image, the image processing apparatus 10 displays a preview image of the read image.

Meanwhile, if the scan image cannot be saved, the image processing apparatus 10 changes the image size to such a size that image data can be saved, and generates image data.

Meanwhile, in the size priority mode, the image processing apparatus 10 performs generation of image data with the highest resolution of resolutions settable to generate image data capable of being saved, without changing the size of the read image, and displays a preview. In this case, in the case where there is no resolution settable, the image processing apparatus 10 displays the scanning-setting change screen (for example, FIG. 11) again.

In the present operation example, the image processing apparatus 10 changes the size or resolution of the read image data depending on the setting value of the operation mode. As a result, the number of times the setting change screen (FIG. 11) is displayed (the process of STEP S216 is performed) decreases, and the number of user's operations which are required to perform the scanning process decreases. Also, the user is not required to set detailed parameters, and it becomes easier to perform scanning processes.

[3] Modifications

The above-described exemplary embodiment is merely an example of an embodiment of the present invention, and may be modified as follows. Also, the above-described exemplary embodiment and the following individual modifications may be combined if necessary.

(1) The display device for displaying preview images may be the display panel of the UI unit 154 installed in the image processing apparatus 10, or may be a display device externally connected to the image processing apparatus 10.

(2) In the above-described exemplary embodiment, in STEP S109 of FIG. 5, the processor 152 performs the process of controlling the display device such that the display device displays the setting change screen usable to make it possible to perform the process of storing the image data. In this process, the processor 152 may control the display device (the UI unit 154 or the UI unit 354) such that the display device displays the setting value of a changed parameter, and control the display device (the UI unit 154 or the UI unit 354) such that the display device displays a preview image corresponding to the setting value of the changed parameter. In this case, in the case where the number of parameters which are change subjects is two or more, while switching the parameters to be displayed, the processor 152 performs control such that display is switched between preview images corresponding to the individual parameters. In this switch control, the processor 152 may display a preview image corresponding to a selected parameter, and whenever the user selects another parameter, the processor may update display with a corresponding preview image. Also, for example, the processor 152 may perform so-called slide show display in which display is switched between the preview images at intervals of a predetermined unit time. Also, the processor 152 may display the two or more preview images in the preview image area.

(3) In the above-described exemplary embodiment, if the user performs an operation for changing the settings relative to the image data, the processor 152 performs the process of changing the settings according to the user's operation. However, the mode of the setting changing process is not limited to the mode shown in the above-described exemplary embodiment. For example, in the case where it is impossible to store the image data in the predetermined memory, the processor 152 may change the settings relative to the image data, regardless of whether a user's operation has been received.

(4) In the above-described exemplary embodiment, as shown in STEP S106 and STEP S108 of FIG. 5, after the preview display is performed, the process of storing the image data is performed. The relation between the timing when the preview display is performed and the storing process is performed is not limited to the relation shown in the above-described exemplary embodiment. For example, before the preview display is performed, the process of storing the image data may be performed. Also, the preview display process and the process of storing the image data may be performed in parallel.

(5) In the above-described exemplary embodiment, the image processing apparatus has the image quality priority mode and the size priority mode as operation modes; however, the image processing apparatus may have any other modes as operation modes. For example, the image processing apparatus may have a file format change mode. In this case, if the file format change mode is selected, the image processing apparatus 10 performs a process of changing the file format (for example, a process of changing the file format from PDF to TIFF) such that the image data can be saved, without performing the process of changing the resolution and the process of changing the image size.

(6) In the above-described exemplary embodiment, the programs which are executable by at least one of the processor 152 and the image processing unit 157 of the image processing apparatus 10 may be downloaded via the communication line such as the internet. Also, these programs may be recorded on a computer-readable recording medium such as a magnetic recording medium (like a magnetic tape or a magnetic disk), an optical recording medium (like an optical disk), a magneto-optical recording medium, or a semiconductor memory to be provided.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor configured to:
      change settings relative to a data amount of image data generated by an image reader that reads a document, in a case where it is not possible to store the image data in a predetermined memory;
      perform image processing on the image data generated according to the changed settings;
      acquire a resolution of a display device;
      generate preview image data having the acquired resolution or resolution lower than the acquired resolution, as preview image data of the generated image data; and also including
   a display that displays a preview image of the image data subjected to the image processing in the case where it is possible to store the processed image data in the memory, wherein the display provides the generated preview image data to the display device.

2. The image processing apparatus according to claim 1, wherein:
in the case where at least one of a data amount and a file format of the generated image data satisfies a predetermined condition, the display displays the preview image of the image data.

3. The image processing apparatus according to claim 2, wherein the processor is configured to:
receive a setting change operation of a user in a state where the preview image is displayed by the display, and
re-perform image processing on the image data generated by the image reader, according to the received setting change operation.

4. The image processing apparatus according to claim 2, wherein the processor is configured to:
present a parameter to be a change subject, to a user, in the case where it is not possible to store the generated image data in the memory, and
receive an operation of the user for changing the setting value of the parameter, and change the settings according to the received change operation.

5. The image processing apparatus according to claim 2, wherein the processor is configured to:
operate according to one operation mode selected from a plurality of operation modes including an image quality priority mode in which the image quality is prioritized, and
in the case where the operation mode is the image quality priority mode, perform a process of reducing size of the image data generated by the image reader, without waiting for a user's instruction to change the settings.

6. The image processing apparatus according to claim 2, wherein the processor is configured to:
operate according to one operation mode selected from a plurality of operation modes including a size priority mode in which size is prioritized, and
in the case where the operation mode is the size priority mode, perform a process of reducing the resolution of the image data generated by the image reader, without waiting for a user's instruction to change the settings.

7. The image processing apparatus according to claim 6, wherein:
in the case where the process of storing the image data in the memory is not performed although the process of reducing the resolution has been performed, the processor is configured to perform a process of urging a user to change the settings.

8. The image processing apparatus according to claim 1, wherein the processor is configured to:
receive a setting change operation of a user in a state where the preview image is displayed by the display, and
re-perform image processing on the image data generated by the image reader, according to the received setting change operation.

9. The image processing apparatus according to claim 8, wherein the processor is configured to:
present a parameter to be a change subject, to a user, in the case where it is not possible to store the generated image data in the memory, and
receive an operation of the user for changing the setting value of the parameter, and change the settings according to the received change operation.

10. The image processing apparatus according to claim 8, wherein the processor is configured to:
operate according to one operation mode selected from a plurality of operation modes including an image quality priority mode in which the image quality is prioritized, and
in the case where the operation mode is the image quality priority mode, perform a process of reducing size of the image data generated by the image reader, without waiting for a user's instruction to change the settings.

11. The image processing apparatus according to claim 1, wherein the processor is configured to:
present a parameter to be a change subject, to a user, in the case where it is not possible to store the generated image data in the memory, and
receive an operation of the user for changing the setting value of the parameter, and change the settings according to the received change operation.

12. The image processing apparatus according to claim 11, wherein the processor is configured to:
display a preview image corresponding to the changed setting value of the parameter, and in the case where the number of parameters to be change subjects is two or more, while switching the parameters, perform control such that the display is switched between preview images corresponding to the parameters, respectively.

13. The image processing apparatus according to claim 1, wherein the processor is configured to:
operate according to one operation mode selected from a plurality of operation modes including an image quality priority mode in which the image quality is prioritized, and
in the case where the operation mode is the image quality priority mode, perform a process of reducing size of the image data generated by the image reader, without waiting for a user's instruction to change the settings.

14. The image processing apparatus according to claim 1, wherein the processor is configured to:
operate according to one operation mode selected from a plurality of operation modes including a size priority mode in which size is prioritized, and
in the case where the operation mode is the size priority mode, perform a process of reducing the resolution of the image data generated by the image reader, without waiting for a user's instruction to change the settings.

15. The image processing apparatus according to claim 1, wherein:
in a case where it is not possible to store the image data in the predetermined memory, the processor is configured to change at least one of (i) a resolution of the image data, (ii) a file format of the image data, (iii) a setting of color mode or monochrome mode, and (iv) a size of the image data.

16. A non-transitory computer readable medium storing a program causing a computer to execute a process for image processing, the process comprising:
changing settings relative to image data when the image data generated by a reading unit configured to read documents is not stored in a predetermined memory;
performing image processing on the generated image data according to the changed settings;
acquiring a resolution of a display device;
generating preview image data having the acquired resolution or resolution lower than the acquired resolution, as preview image data of the generated image data;

displaying a preview image of the image data when the image data obtained by performing the image processing is saved in the memory; and providing the generated preview image data to the display device.

\* \* \* \* \*